United States Patent
Geppert

[11] Patent Number: 5,940,939
[45] Date of Patent: Aug. 24, 1999

[54] ONE-PIECE FLAT BAND CLAMP

[75] Inventor: Helmut Geppert, Karlstein, Germany

[73] Assignee: Rasmussen GmbH, Maintal, Germany

[21] Appl. No.: 08/986,542

[22] Filed: Dec. 8, 1997

[30] Foreign Application Priority Data

Dec. 6, 1996 [DE] Germany .......................... 196 50 674

[51] Int. Cl.⁶ .................................................. B65D 63/00
[52] U.S. Cl. .................. 24/20 R; 24/20 CW; 24/200 EE
[58] Field of Search ........................ 24/20 R, 22, 20 CW, 24/20 EE, 23 EE

[56] References Cited

U.S. PATENT DOCUMENTS

| | | | |
|---|---|---|---|
| 4,275,484 | 6/1981 | Irio et al. ................................. | 24/20 R |
| 4,430,775 | 2/1984 | Arthur . | |
| 4,713,863 | 12/1987 | Jennings ................................. | 24/20 EE |
| 4,924,558 | 5/1990 | Calmettes et al. ................... | 24/20 CW |
| 4,930,192 | 6/1990 | Muhr ....................................... | 24/20 R |
| 5,216,783 | 6/1993 | Calmettes et al. ..................... | 24/20 R |
| 5,261,145 | 11/1993 | Jennings . | |

FOREIGN PATENT DOCUMENTS

| | | |
|---|---|---|
| 0 003 192 | 7/1979 | European Pat. Off. . |
| 0 636 826 | 7/1994 | European Pat. Off. . |
| 2470275 | 11/1979 | France . |
| 2 516 181 | 5/1983 | France . |
| 2 683 869 | 6/1993 | France . |
| 2 705 410 | 11/1994 | France . |
| 279525 | 5/1987 | Spain . |
| 2 118 613 | 11/1983 | United Kingdom . |

Primary Examiner—Victor N. Sakran
Attorney, Agent, or Firm—Darby & Darby

[57] ABSTRACT

A one piece, flat band clamp includes a clamp band and a snap closure. The snap closure includes a catch hook disposed at the radial outer end of a first clamping jaw. An abutment is formed near a free end of a stem, which is connected at an essentially right angle to the outer radial end of a second clamping jaw. The catch hook is narrower in axial width than the clamp. In the closed position of the snap closure, the hook engages in an opening of the stem.

10 Claims, 2 Drawing Sheets

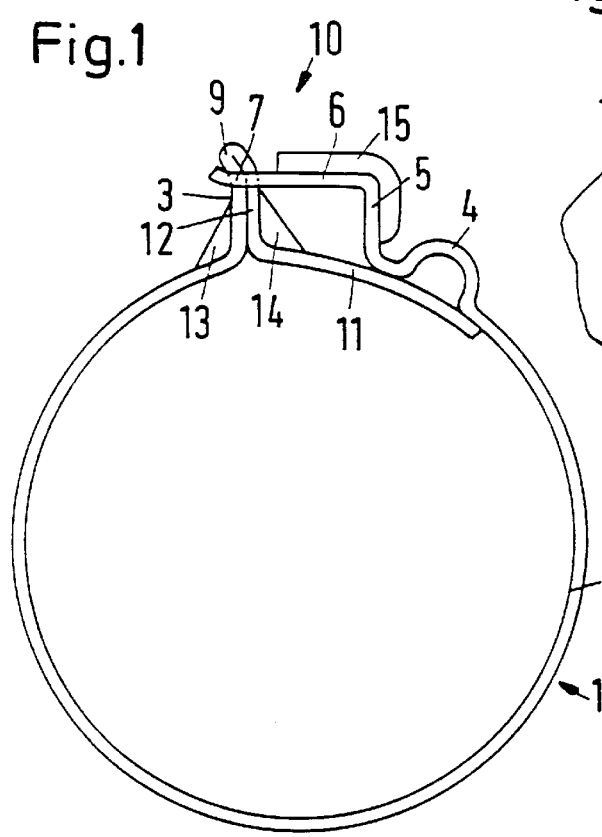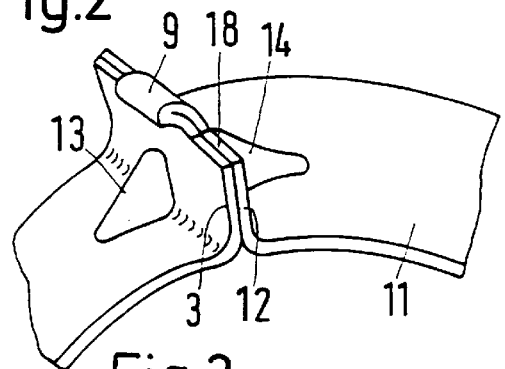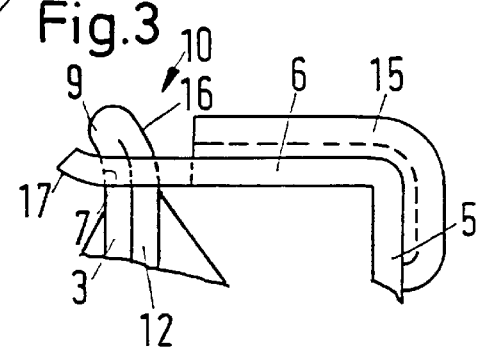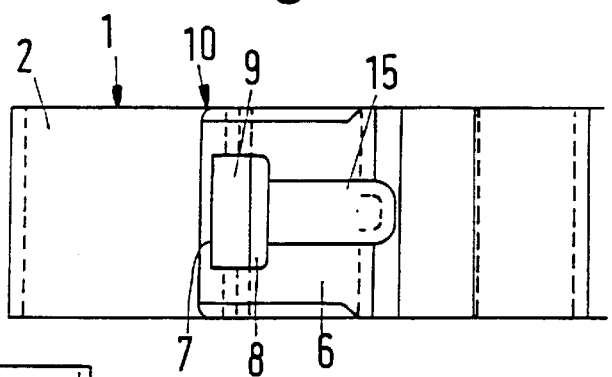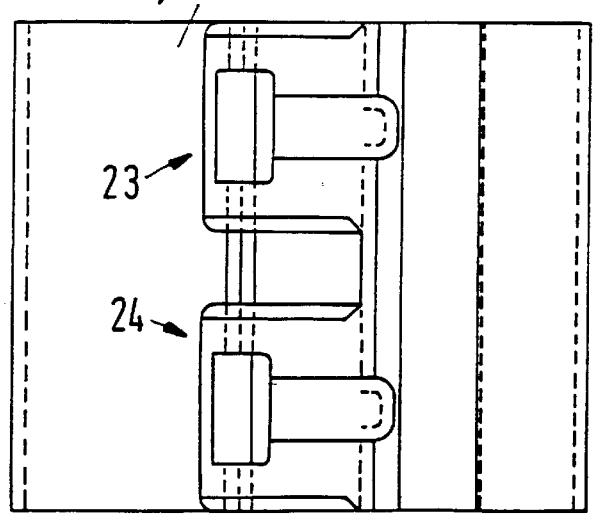

ONE-PIECE FLAT BAND CLAMP

BACKGROUND OF THE INVENTION

1. Field of the Invention

The present invention relates to a one piece flat band clamp that has a first radially outwardly projecting clamping jaw and a second radially outwardly projecting clamping jaw disposed at a first and a second circumferential end portions of the clamp band, respectively. A hook is disposed at the radial outer end of the first clamping jaw. A stem is connected to the radial outer end of the second clamping jaw. The stem is bent at an essentially right angle with respect to the second clamping jaw. An abutment is formed in the stem near a free end of the stem, which is remote from the second clamping jaw. A snap closure is actuated by pressing the two clamping jaws toward each other, thereby causing the hook to engage with the abutment.

2. Discussion of the Related Art

Clamps are known, for example, from European reference No. EP 0 003 192 B1. A hook is disposed at a first circumferential end of the clamp. A stop 2 is formed by a front face of a stem which is bent back away from the first circumferential portion by an angle of about 160°. The bend in the stem starts about halfway up the second clamping jaw. If the stop is disposed so that there is only a minor radial overlap with the first clamping jaw, the stem will protrude outwardly relatively far in the radial direction, which inherently increases the risk of an accidental opening of the snap closure. If, on the other hand, the stop is located so that there is an extensive radial overlap, the stem will be required to move a substantial amount to engage the snap closure.

Accordingly, it is an object of the present invention to provide a clamp that is easy to move from the open position to the closed position and, thereafter, has a minimal risk of accidentally opening.

SUMMARY OF THE INVENTION

These and other objects are achieved in accordance with the present invention by making the width of the hook narrower than that of the clamp band, thereby allowing the hook to engage in an opening of a stem when the clamp is in the closed position.

An abutment for the hook is formed by the edge of an opening in the stem. Therefore, the abutment is at the same radial level as the stem, thereby producing a snap closure that has a relatively small radial extension from the band.

In the closed position, the stem only has to support the tensile forces applied by the clamp. Additionally, in the closed position, the hook is prevented from moving both in the radial direction and the axial direction.

The juncture between the first clamping jaw and the clamp band and the juncture between the second clamping jaw and the stem are both preferably reinforced by contouring the clamp band material. The radial length of the catch hook can be maintained relatively short because the clamping jaw that supports the hook is not deformed by the tensile forces because the juncture between the first clamping jaw and the clamp band is reinforced.

The stem preferably has a radially inwardly facing inclined surface disposed in front of the opening (i.e., between the opening and the free end of the stem) to facilitate the insertion of the hook into the opening.

The hook is preferably formed as a slightly angled tongue so that the snap closure can be effected by simply pressing the two clamping jaws together. Because of the inclined surface of the stem and the angled hook, even less force is required to actuate the snap closure.

In the closed position, a stop is preferably disposed next to the hook so that the stem will be located in a precisely defined position when the clamp is in the closed position. Accordingly, the clamping stress applied by the clamp in the closed position is fairly well defined by the dimensions of the strip band.

The snap closure preferably rests in an intermediate stop position that precedes the closed position. In the stop position, the two clamping jaws are spaced farther apart from one another than in the closed position. In the stop position, the assembler may first loosely join the two parts to be clamped together, and thereafter, may join the two components together by moving the clamp from the stop position to the closed position with, for example, a conventional tool, such as a pair of pliers.

The stop position is formed by shaping the free end of the stem in a counterhook, which projects radially inwardly. In the stop position, the counterhook engages with the hook.

The clamp band is preferably flat and is provided with an extension that begins with a 180° bend at the outer radial end of the first clamping jaw and continues with a bend of about 90° at the radial level of the base of the first clamping jaw to form a bridge spanning the space between and underneath the two clamping jaws. The catch hook is formed by the narrowed, double walled, end section of the first clamping jaw. Thus, the clamp according to the present invention can be utilized with hose clamps that have a double walled first clamping jaw.

The first clamping jaw is preferably reinforced to prevent it from unintentionally deforming. To reinforce the first clamping jaw, the angle between the first clamping jaw and the adjoining section of the clamp band are preferably strengthened with a corrugated rib. Additionally, the angle between the extension of the clamp band, which extends parallel to the clamping jaw, and the adjoining section of the bridge section is also preferably reinforced with a rib.

The bridge section preferably slides under a compensating undulation in the other circumferential end of the clamp band. The compensating undulation compensates for tolerances in manufacturing the clamp band.

If an extra wide flat clamp band is used, preferably two or more snap closures, which are placed in a side by side relationship, are used.

BRIEF DESCRIPTION OF THE DRAWING FIGURES

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 1 is a plan view of a one piece flat band hose clamp according to the present invention shown in the closed position;

FIG. 2 is an enlarged partial view of a perspective view of the first clamping jaw;

FIG. 3 is an enlarged partial plan view of the snap closure of the hose clamp of FIGS. 1 and 2;

FIG. 4 is a top view of the hose clamp of FIG. 1;

FIG. 5 is a top view of a second embodiment of a hose clamp having a wide band clamp according to the present invention;

DETAILED DESCRIPTION OF THE PREFERRED EMBODIMENT

Figure 6:
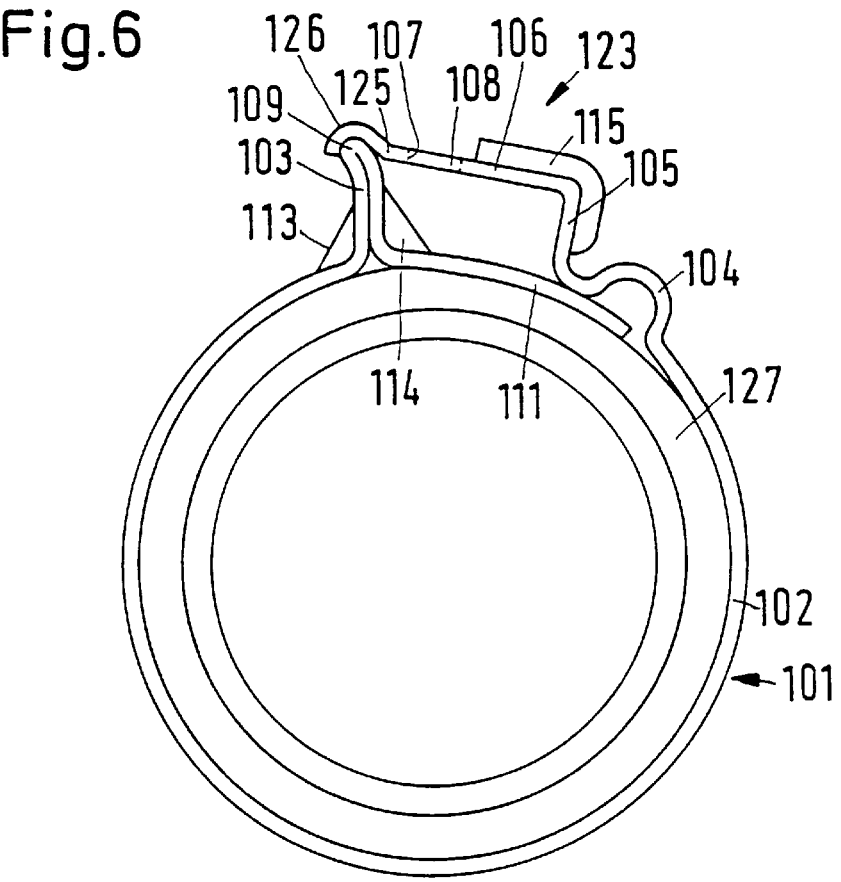
FIG. 6 is a plan view of a third embodiment of a hose clamp having a modified wide band clamp according to the present invention and shown in an intermediate stop position.

Referring now to FIGS. 1–4, a flat band clamp 1 is illustrated. Clamp 1 is typically used to clamp a hose onto a pipe fitting. Clamp 1 includes a flat clamp band 2 that has a first clamping jaw 3 projecting radially outwardly at a first circumferential end and a second clamping jaw 5 projecting radially outwardly at a second circumferential end of the flat clamp band 2.

An undulation 4, in the form of a semi-circular protrusion, is disposed in the clamp band adjacent to the second clamping jaw. A stem 6 is connected to the second clamping jaw 5. Stem 6 is bent at essentially a right angle with respect to the second clamping jaw 5. An abutment 7 is formed by one edge of a cutout or opening 8 in stem 6. Opening 8 receives catch hook 9 to form a snap closure 10, thereby placing the clamp in a closed position. A bridge section 11 extends from the first clamping jaw 3 under the second clamping wall 5 and then under undulation 4. Bridge section 11 is an extension of the clamp band 2. A connecting section 12 of the clamp band 2 is connected to the first clamping jaw 3 via an approximately 180° bend and is connected to the bridge section 11 via an approximately 90° bend at the first radial level of the base of the first clamping jaw 3. Catch hook 9 is preferably formed by removing material from first clamping jaw 3 and connecting section 12 at the 180° bend, thereby forming catch hook 9 so that it has a narrower axial width than a width of stem 4 so that catch hook 9 can fit into opening 8. A rib 13 reinforces the angle between the clamp band 2 and the first clamping jaw 3. 5 Similarly, a rib 14 reinforces the angle between the connecting section 12 and the bridge section 11. A rib 15 reinforces the angle between second clamping jaw 5 and stem 6. Stem 6 is further reinforced by having its outer (i.e., axial) edges being turned up slightly (see FIG. 4).

Catch hook 9 is slightly bent backwards, which produces a radially 10 outwardly facing inclined surface 16. Likewise, the free end of stem 6 is slightly bent radially outwardly to produce a radially inwardly facing sloped or inclined surface 17. In their "off-the-shelf" open state, the clamping jaws 3 and 5 are spaced farther apart than in the closed state of the clamp, which is shown in FIG. 1. When the clamping jaws 3 and are pressed toward each other, for example, by a tool designed to engage the clamping jaws, the inclined surfaces 16 and 17 contact against each other. Further pressing together of the clamping jaws 3 and 5 causes stem 6 to slide over the catch hook 9, while at the same time compressing the hose that is to be fastened about a pipe. The clamping jaws are pressed together until the snap closure snaps into its locked position. A stop 18 is formed by the radially outwardly facing surface of the removed material from first clamping jaw 3 and connecting section 12. Stop 18 defines the end position of stem 6 in the closed position.

Referring now to FIG. 5 another embodiment of a clamp having a wide strip clamp 21 that is formed from an extra wide clamp band 22 is illustrated. Two snap closures 23 and 24 are provided because of the extra width of clamp 21. Snap closures 23, 24 preferably have the same configuration as snap closure 10 described above and illustrated in FIGS. 1–4. A wide strip clamp 21 may be used, for example, to seal a rubber sleeve about a drain pipe.

Figure 7:
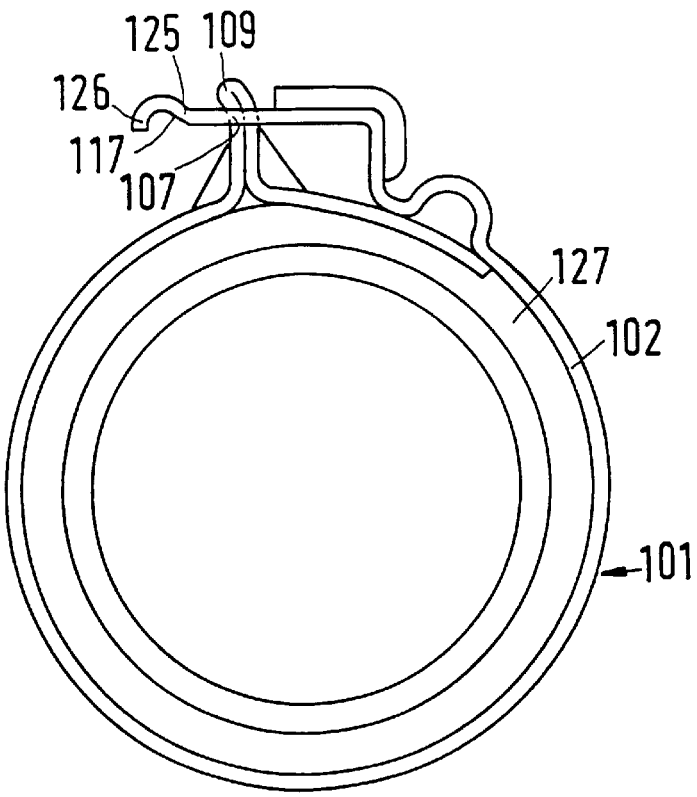
FIG. 7 is a plan view of the wide strip clamp of FIG. 6 shown in the closed position.

Referring now to FIGS. 6 and 7, another embodiment of a wide strip clamp 101 is illustrated. The reference numerals for like elements in this second embodiment are increased by 100 when compared to the reference numerals used in FIGS. 1–4. Clamp 101 differs from clamp 1, inter alia, in that stem 106 is provided with, at its free end, an extension 125 which features a counterhook 126 that points radially inwardly. Extension 125 includes a radially inwardly facing inclined surface 117 to facilitate the insertion of catch hook 109 into opening 108. Additionally, catch hook 109 can engage in the counterhook 126 to place the clamp in an intermediate stop position where the clamp is partially tightened.

Clamp 101 includes a rubber sleeve 127. In the stop position (See FIG. 6), rubber sleeve 127 is held in place in clamp 101 by friction. However, the installer can still slip the clamp over the two pipe ends to be connected and, thereafter, align the pipes so that they are at the desired angular orientation. Once the desired angular orientation is achieved, clamping walls 103, 105 can be pressed together with a conventional tool to move the clamp from the stop position (see FIG. 6) to the closed position (see FIG. 7) so that hook 109 engages with abutment 107 to, thereby, form the snap closure 123.

In all of the embodiments, the entire clamp, including the snap closure, is made of a single piece of strip material, which, when required, can be a heat-resistant and/or a corrosion resistant material. Moving the clamp into the closed position is typically done with a conventional pair of pliers, which are applied to the clamping walls to manually or pneumatically press the clamping walls toward one another. The clamping stress of the clamp in the closed position is defined fairly precisely by the dimensions of the clamp. Thus, a proper sizing of the clamp will prevent too small or too great of a clamping stress being applied by the clamp.

What is claimed is:
1. A clamp comprising:
 a clamp band made of a one-piece material having a first circumferential end portion and a second circumferential end portion;
 a first clamping jaw projecting radially outwardly from said first circumferential end portion;
 a second clamping jaw projecting radially outwardly from said second circumferential end portion;
 a hook disposed at a free end of said first clamping jaw, said hook being formed by a double walled end section of said first clamping jaw;
 an approximately circumferentially extending stem being bent at essentially a right angle from a radial outer end of said second clamping jaw, said stem having an opening disposed adjacent to a free end of said stem, said opening being defined by a plurality of edges, an abutment being formed by at least one of said edges, said abutment together with said hook forming a snap closure that is actuated by moving said first clamping wall toward said second clamping wall so that said clamp band moves from an open position to a closed position, said hook having an axial width that is smaller than an axial width of said stem;
 wherein said clamp band has a stop position between the open position and the closed position, wherein in said stop position said first and second clamping walls are disposed further apart from one another than in said closed position, and a counterhook is disposed at said free end of said stem, in said stop position, said counterhook engaging with said hook.

2. The clamp according to claim 1, wherein an angle of said clamp band between said first clamping jaw and an adjoining section of said clamp band and the angle of said clamp band between said second clamping jaw and an adjoining section of said stem are each reinforced by a rib that is corrugated into the clamp band.

3. The clamp according to claim 1, wherein said stem has a radially inwardly facing inclined surface disposed between a free end of said stem and said opening to facilitate the insertion of said hook into said opening.

4. The clamp according to claim 1, wherein said hook is formed as a slightly angled tongue.

5. The clamp according to claim 1, wherein in said closed position, a stop for said stem is formed by a radially outwardly facing surface of said first clamping wall, said stop being disposed adjacent to said hook.

6. The clamp according to claim 1, wherein said clamp band has an extension that begins with an approximately 180° bend at an outer radial end of said first clamping jaw and continues with a bend of approximately 90° at a radial level of a base of said first clamping jaw to form a bridge spanning the space between and underneath said first and second clamping jaws.

7. The clamp according to claim 1, wherein an angle formed between said first clamping jaw and an adjoining section of said clamp band is reinforced by a rib.

8. The clamp according to claim 7, wherein an angle formed between a section of said extension of the clamp band, which section extends parallel to said first clamping jaw, and an adjoining section of said bridge is reinforced by a rib.

9. The clamp according to claim 8, wherein said bridge extends to a point underneath a compensating undulation in said second circumferential end portion of said clamp band.

10. The clamp according to claim 1, wherein said clamp band has at least two snap closures.

* * * * *